United States Patent
Vieth, Jr.

[11] 3,743,361
[45] July 3, 1973

[54] ANTI-SKID SYSTEM AND METHOD
[75] Inventor: George Vieth, Jr., Springfield, Va.
[73] Assignee: Diamond Squared Industries, Inc., Phoenix, Ariz.
[22] Filed: Aug. 13, 1971
[21] Appl. No.: 171,556

[52] U.S. Cl.......................... 303/21 CH, 188/181 T
[51] Int. Cl.................................................. B60t 8/10
[58] Field of Search............................ 73/131, 133; 188/181 T; 303/21 CH

[56] References Cited
UNITED STATES PATENTS
3,490,556 1/1970 Von Keszycki ............ 303/21 CH X
3,537,759 11/1970 Du Bois.......................... 303/21 CH Primary Examiner—Duane A. Reger
Assistant Examiner—Stephen G. Kunin
Attorney—Dominik, Knechtel & Godula

[57] ABSTRACT

A novel and improved anti-skid system for vehicles or the like is disclosed consisting of an axle torque sensing torque rod for sensing sudden changes in the torque of the wheel axle, hydraulically computing the derivative of axle torque as a function of time, the torque rod being in fluid communication with a pressure regulating valve interposed between the service brake chamber and the atmosphere, transmitting information relating to the derivative of torque to the regulator valve, whereby under impending skid conditions, the regulator valve is caused to bleed fluid pressure from the service brake chamber thereby to permit free rotation of the vehicle wheel involved and prevent wheel lock-up.

17 Claims, 6 Drawing Figures

PATENTED JUL 3 1973 3,743,361

INVENTOR
GEORGE C. VIETH
BY
Dominik, Knechtel & Godula
ATTYS.

ANTI-SKID SYSTEM AND METHOD

BRIEF DESCRIPTION OF THE INVENTION

The present invention is directed to a novel Anti-Skid System designed for installation and implementation of existing braking systems presently available on commercial vehicles such as truck trailers or the like, which is capable of sensing sudden changes in the torque and/or counter-torque in the axle of an associated wheel, computing the derivative of axle torque and transmitting the information relating to the derivative of torque to a control valve which will in turn regulate the fluid pressure in the service brake chamber of the brake unit. More particularly, the Anti-Skid System of the present invention is designed to sense an impending wheel lock-up especially in a skid situation, by sensing sudden changes in the axle torque and to immediately transmit this information to a control valve for the purpose of bleeding off a sufficient quantity of the fluid pressure in the service brake chamber of the brake unit, whereby the fluid pressure in the brake actuating mechanism is reduced thereby enabling the wheel to rotate more freely to avoid skidding, and stabilizing the vehicle's path of travel.

BACKGROUND OF INVENTION

It has been known for some time that skidding situations, especially in connection with truck trailers, or other similar large vehicles, present a serious danger to the operator of the vehicle as well as to other motorists on the road. Under certain conditions, a wheel lock-up can cause a vehicle such as a trailer truck to jack-knife and overturn. Hence, various systems have been proposed and designed for the purpose of attempting to sense and prevent or overcome such wheel lock-up and skidding situations. The ideal system would provide a means whereby impending skid situations could be sensed, and this information transmitted to the service brake unit for the purpose of bleeding off fluid pressure in the brake chamber, thereby permitting release of the stationary brake member from the associated rotating member in order to permit the wheel to rotate more freely preventing wheel lock-up.

One of the commercial systems which has been proposed recently has involved an electronic system which is designed to sense the negative rate of change of wheel acceleration. This information is then fed electronically to a device such as a solenoid-actuated pressure relief valve which is usually coupled to and acts to release brake fluid pressure from the service brake unit of the brake actuating mechanism. Such electronic systems are actually designed to measure the wheel acceleration on a constant basis, and by sensing and tracking what is happening to the wheel acceleration, such systems can theoretically sense and prevent an impending wheel lock-up or skid situation. However, such systems suffer from certain very serious defects or disadvantages in that the maintenance of such systems has been difficult and has required rather frequent repairs and adjustments, which necessarily means that the vehicle upon which such equipment is installed must be taken out of service and constantly maintained. Another problem which has been experienced is the fact that such systems cannot be installed on existing vehicles without major changes to the vehicle, since sophisticated electronic equipment must be installed. This fact represents an extremely high cost factor and therefore renders these systems less commercially desirable. Finally, such systems must, of necessity, incorporate indicator devices to indicate to the operator of the vehicle any defects in the system, otherwise, the operator could be operating the vehicle without knowing that the electronic system is not functioning properly. This fact necessarily requires that the operator understand to some extent, how to read electronic indicating devices in order to know whether or not the electronic anti-skid system aboard the vehicle is properly functioning. Hence, it is clear that the installation of a separate electronic system aboard an existing vehicle is not the preferred method of obtaining an efficient and economical anti-skid system aboard a vehicle.

In the various mechanical or hydraulic anti-skid systems which have been proposed to date, the change of torque existing in the brake assembly has been utilized as the means for obtaining information regarding the condition of the wheel at any particular moment, and this information has then been utilized to operate a control valve which, in turn, regulates the amount of brake fluid pressure transmitted to the master brake cylinder in an attempt to prevent the brakes from becoming fully activated and thereby permitting the wheel to continue rotating.

For example, U.S. Pat. No. 3,369,635 shows and describes an anti-skid braking system which includes a control valve system connected directly to the brake housing and measures the torque existing on the disc brake caliper-type housing. It utilizes this information to operate the control valve and hence the pressure in the hydraulic brake applying mechanism. Another example of a brake system which employs an anti-skid feature is shown in U.S. Pat. No. 3,294,204 which once again requires that the brake system be modified to include a control valve system therein, which is mechanically operatively connected to the brake unit for measuring the torque existing on the brake housing and transmitting this information to a control valve which, once again, regulates the flow of fluid pressure from the master brake cylinder to the brake applying mechanism.

Another version of such a system is shown in U.S. Pat. No. 3,404,758 which, once again, comprises a modified brake system including an anti-skid control valve connected directly to the brake housing for measuring the changes of torque existing on the brake housing and transmitting this information to the control valve which, in turn, regulates the flow of fluid pressure to the brake applying mechanism.

Another modified version of the same type of system is shown in U.S. Pat. No. 2,999,567 which employs an arm connected to the backing plate of the brake housing and thereby measures the brake torque created by the friction of the shoes on the inner periphery of the brake drum. This information is transmitted through control sensing units to a torque control unit which, in turn, regulates a control valve for controlling the flow of fluid pressure to the master brake cylinder. Another similar system is shown in U.S. Pat. No. 3,537,759 which also employs an arm operatively connected to the backing plate of the brake housing and is also connected to a hydraulic mechanism for transmitting the information to a control valve once again which will, in turn, regulate the flow of fluid pressure from the source of fluid pressure to the master cylinder in the brake, thereby regulating the braking power of the brake mechanism.

It is clear from the above collection of prior art patents that, to date, in order to have an anti-skid system operatively employed on a vehicle, it has been necessary to extensively modify the brake units thereof, in order to accommodate such systems. As a result, such mechanical or hydraulic anti-skid systems have not been extensively utilized due to the cost and inconvenience involved in the manufacture of modified brakes for installation upon such vehicles. In addition, it is believed that the sensitivity of such anti-skid braking systems is less than desirable and hence, such systems have not had good commercial success.

STATEMENT OF THE INVENTION

The present invention is intended to provide an improved anti-skid system which is quick-acting and sensitive to changes in the torque of the axle of a vehicle, and which is designed to compute hydraulically the derivative of the axle torque, which information is then utilized to regulate the fluid pressure in the service brake chamber of the brake actuating mechanism. More specifically, the anti-skid system of the present invention includes a hydraulically activated torque rod which is connected at its one end to the axle housing, and at its other end to the truck body, or underframe, the torque rod being in fluid communication with a control valve which is mounted on the underside of the truck body, which, in turn, is in fluid communication with the service brake chamber of the brake actuating mechanism. Under impending skid situations, and where the axle torque of the vehicle changes suddenly, the torque rod will sense such sudden changes in the axle torque and hydraulically compute the derivative of torque, which information is then transmitted to the control valve which then operates to open a fluid pathway between the service brake chamber of the brake actuating mechanism and atmosphere whereby brake fluid pressure is caused to be bled or dumped from the system to relieve the brake mechanism and permit the associated wheel to rotate more freely, thereby preventing wheel lock-up.

The novel torque rod of the present invention comprises a housing in which is disposed a spring loaded piston, the head of the piston having an orifice disposed therethrough. The cylindrical housing is filled with hydraulic fluid which travels from one end of the piston to the other through the piston head orifice as the piston and piston head are caused to move within the hosing. Adjacent the forward end of the torque rod is mounted a fluid pressure sensing device, such as a bourdon tube system, or an open port which is connected via a fluid line to the regulator valve. Hence, as the area surrounding the bourdon tube system or open port experiences changes in the fluid pressure within the cylinder housing due to the action of the piston within the housing, such changes of fluid pressure will be sensed and transmitted to the control valve which will, in turn, control the fluid pressure in the brake actuating mechanism. The torque rod is mounted at its forward end directly on the truck body at a mounting point and the rear end of the torque rod is mounted directly on the axle housing. Hence, as sudden changes occur with respect to the axle torque, slight movement will be experienced between the axle and the truck frame or body, and this movement will cause a concomitant movement of the piston within the housing of the torque rod.

In the normal stopping situation, the truck body tends to continue to move in the forward direction, while the rear axle tends to be pulled rearwardly by virtue of the action of the brake. Under an impending skid situation, the wheel axle loses torque suddenly and this loss of torque is sensed by the torque rod and the derivative of torque hydraulically computed due to the construction as generally set forth above. While it is conceivable that the axle housing torque may be utilized to directly regulate the brake force, there are some disadvantages in utilizing azle torque directly. The main disadvantage is that it would be necessary to carefully calibrate the magnitude and polarity of the control commands. For this reason it has been found that it is highly desirable to utilize the rate of change of torque with respect to time or as it shall be referred to hereinafter: "derivative of torque" and apply this information to the control valve which will then, in turn, regulate the brake pressure. The use of the derivative of torque with respect to time has two main advantages in that the device is very efficient and quick in operation, and secondly, is self-restoring itself to its normal operating condition. The ability of the system to restore itself to its normal operating condition is a direct function of the speed with which the hydraulic fluid restores itself back through the orifice in the piston head, which is, in turn, dependent upon the viscosity of the hydraulic fluid and the size of the orifice.

As a matter of mathematics, the derivative of torque is a function which is dependent upon the rate of change of the axle housing torque with respect to time, and this function is also dependent upon the viscosity of the hydraulic fluid as well as the size of the orifice. In theory, one is actually more concerned with the resistance of flow of the hydraulic fluid, multiplied by the viscosity which thereby establishes a certain constant factor. The mathematical equation which expresses the mode of operation of the system of the present invention is represented as follows:

$$f(t) = D(dx/dt)$$

where $f(t)$ is the output, $D$ is a factor determined by the resistance of flow of the hydraulic fluid multiplied by the viscosity thereof, and $dx/dt$ the rate of change of torque with respect to time.

As will be more fully described hereinafter, the structure inherent in the torque rod of the present invention which is primarily responsible for generating information with respect to the derivative of torque, is the orifice disposed in the piston head and the viscosity of the hydraulic fluid employed within the cylindrical housing of the torque rod. Hence, the size of the orifice and the viscosity of the fluid determine the speed with which the hydraulic fluid will pass through the orifice, and in effect, thereby determines the pressure which is applied against the bourdon tube's pressure sensor, or the fluid pressure which would exist in the fluid line between the torque rod and the control valve where an open line is employed.

It is therefore the principal object of the present invention to provide an improved anti-skid system for use in connection with motorized vehicles, especially those having fluid pressurized braking systems, which system is designed to sense sudden changes in the torque of the axle, thereby to sense impending skid situations, and to transmit such information to control means for thereby controlling the pressure existing in the service brake unit of the vehicle.

Another object of the present invention is an improved anti-skid system for use on motorized vehicles which employs hydraulic means for sensing sudden changes of torque in the axle of the vehicle, thereby to sense impending skid situations, and to hydraulically transmit this information to a control valve which in turn operates to reduce the fluid pressure existing in the service brake chamber of the brake actuating mechanism thereby to enable the wheel involved in the skid situation to rotate more freely and avoid wheel lock and a skidding posture.

Still a further object of the present invention is to provide an anti-skid system for use in connection with motorized vehicles which may be installed upon existing vehicles without the need of changing or modifying the brake units thereof, and consequently, may be easily installed on presently existing vehicles.

Another object of the present invention is to provide an anti-skid system for use in connection with motorized vehicles of the type set forth above, which not only may be installed upon existing vehicles without the need for changing or modifying the brake units thereof, but also, to provide an improved anti-skid system which is economical in cost, and which greatly minimizes the need for maintenance thereby reducing the cost of operation for operating such a motorized vehicle.

A further object of the present invention is to provide an anti-skid system for motorized vehicles of the type set forth above, which develops information with respect to the derivative of axle torque as opposed to measuring axle torque directly, and also as opposed to measuring the torque existing on the brake housing as shown in the prior art, which thereby provides an anti-skid system which is efficient and quick acting and is also self-restoring after an impending skid situation has occurred and wheel lock-up has been prevented.

Yet another object of the present invention is to provide an anti-skid system for motorized vehicles, or the like, which includes torque rod means having one end thereof mounted on the axle housing of a vehicle, and the other end thereof mounted on the vehicle body or underframe, the torque rod means being operatively connected to control means which is, in turn, in fluid communication with the brake actuating mechanism of the vehicle, whereby sudden changes in the torque of the vehicle axle will be sensed and corresponding information transmitted to the control means, which in turn, functions to relieve fluid pressure from the brake actuating mechanism of the brake unit thereby to relieve the brake pressure and enable the wheel to rotate more freely preventing wheel lock-up.

A further object of the present invention is to provide a novel and improved anti-skid system for motorized vehicles of the type generally described above, wherein the torque rod comprises a cylindrical housing having a piston slidably disposed therein, the piston having a piston head which is provided with an orifice disposed therethrough, the piston head being spring biased, adjacent both of its operative surfaces by means of coil springs having sufficient tensional force to prevent exaggerated movement of the piston within the housing, the housing being provided with a fluid pressure sensing means adjacent one end, and the housing being filled with hydraulic fluid whereby movement of the piston within the housing will cause hydraulic fluid to flow through the orifice of the piston head and cause a corresponding change in the pressure which may be sensed by the fluid pressure sensing means and this information transmitted to a control means for ultimately controlling the fluid pressure in the brake actuating mechanism of the brake unit thereby resulting in a prevention of wheel lock-up and skidding.

Still another object of the present invention is to provide a novel torque rod assembly for use in connection with motorized vehicles which consists of a housing having a piston slidably disposed therein, the piston being provided with a piston head which is in fluid sealing engagement with the interior walls of the housing and having an orifice transversing the piston head thereby to provide a flow path across the piston head, the housing being closed at its one end and apertured at its opposed end thereby to provide an opening for the extension therethrough for the outer end of the piston, hydraulic fluid completely filling the housing and on both sides of the piston head, the rear end of the housing being provided with fluid pressure sensing means which is responsive to fluid pressure exerted by the fluid within the housing, and a pair of springs biasing the piston head within the housing, whereby movement of the piston with respect to the housing will cause a concomitant change in the fluid pressure, according to the expression $P = dF/dt$ where $P$ is pressure and $F$ is applied force, within the housing which will, in turn, be sensed by the fluid pressure sensing means and which information may be utilized elsewhere via a fluid communication between the fluid pressure sensing means and the balance of the system.

Another object of the present invention is to provide a novel regulator control valve which is so constructed as to be sensitive to fluid under pressure thereby to activate the control valve and establish a fluid path between the fluid outlet line and atmosphere.

Still another object of the present invention is to provide a method for sensing and preventing wheel lock-up and vehicle skidding which comprises the steps of providing means adjacent an associated vehicle axle for sensing sudden changes in the torque of the associated vehicle axle, providing control means interposed between and in operative communication with the axle torque sensing means and the braking system of the vehicle for thereby controlling the supply of fluid pressure to the brake actuating mechanism in response to actuation of the axle, torque sensing means, sensing sudden changes in the torque of an associated vehicle axle by actuation of the axle torque sensing means transmitting information regarding the sudden changes in the axle torque to the control means, and activating the control means in response to the actuation of the axle torque sensing means thereby to reduce fluid pressure in the brake actuating mechanism and permit the associated wheel to rotate more freely and prevent wheel lock-up.

Further features of the invention pertain to the particular arrangement of the parts and the interconnection thereof, whereby the above-outlined and additional operating features are attained.

The invention, both as to its organization and method of operation, together with further objects and advantages thereof, will best be understood by reference to the following specification taken in connection with the accompanying drawings in which:

Figure 1:
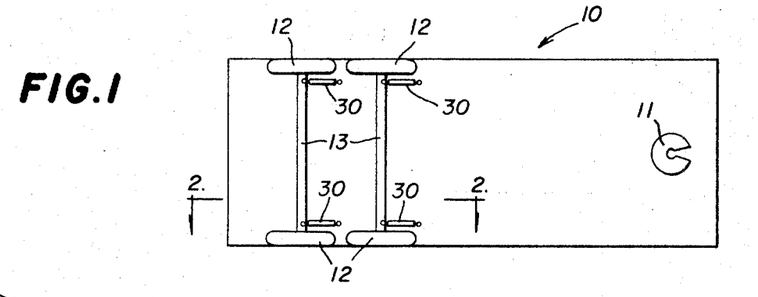
FIG. 1 is a plan view showing the undersurface of a typical truck trailer.
Figure 2:
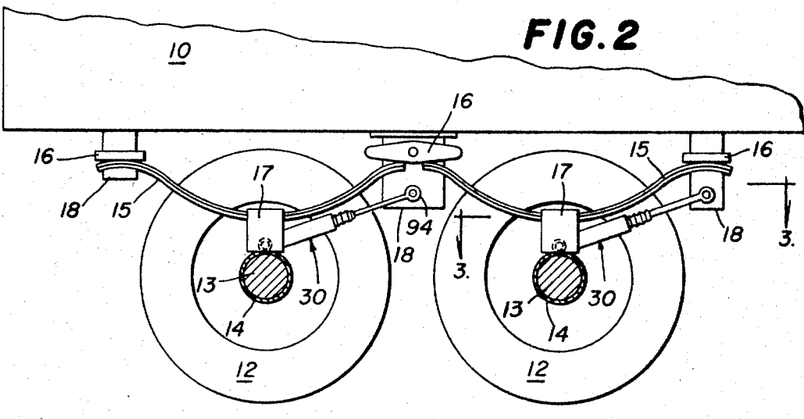
FIG. 2 is a side elevational view of a pair of trailer wheels having the novel torque rod of the present invention connected thereto in place of the conventional radius or torque rod, taken in the direction of the arrows along the line 2—2 of FIG. 1.
Figure 3:
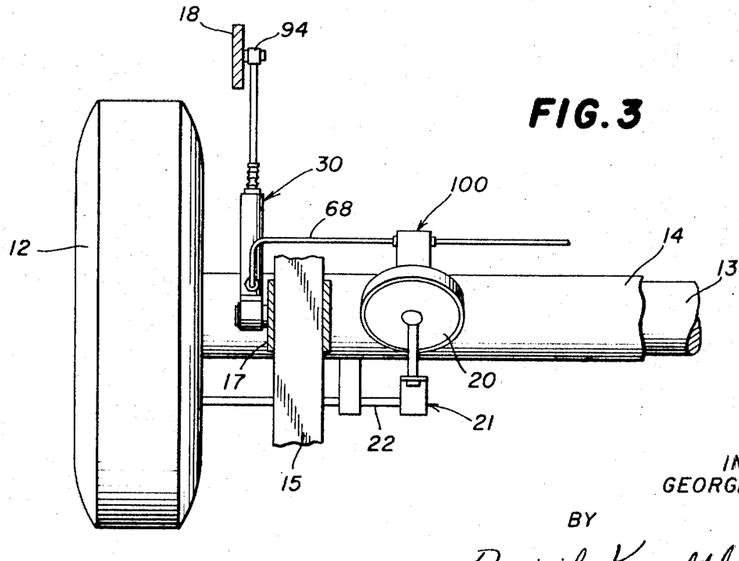
FIG. 3 is a top view of the system of the present invention as connected to an axle housing of a typical truck trailer taken in the direction of the arrows along the line 3—3 of FIG. 2.

Referring now to FIGS. 1 through 3 of the drawings, there is shown a truck trailer unit referred to by the numeral 10, which is provided with a mounting plate 11, for mounting the trailer unit 10 to a truck tractor in the normal fashion. The trailer 10 is provided with a plurality of wheels 12, which as shown in FIG. 1 of the drawings, includes a series of four wheels 12, mounted on a pair of axles 13 which are enclosed within an axle housing 14 as more particularly shown in FIG. 2. Each of the wheels 12, is provided with a series of springs 15, which springs 15 are connected to or mounted upon the appropriate spring mount 16, the springs 15 being held together by spring clamps 17, all of which construction is familiar to those skilled in the art. The trailer 10 is provided with an underframe 18, which in the normal construction is the base upon which the trailer assembly is welded. The underframe 18 provides convenient mounting points for the spring mounts or pads 16 as well as the normal torque arms which are found on virtually all of the trailer vehicles.

With reference to FIG. 3 each wheel assembly 12 is provided with a service brake unit 20 which is usually fixed to or mounted upon the axle housing 14, or some other suitable structure underneath the vehicle, such as the underframe 18. The service brake unit 20 is connected with the brake actuating mechanism (not shown) existing within the hub of the wheel 12 by means of a brake actuating assembly generally referred to by the numeral 21, which in the present embodiment is shown to include a brake cam shaft 22 which ultimately activates and deactivates the brake actuating mechanism.

In the normal construction of such trailer vehicles, each of the axles is held in a finite fixed position by means of a pair of torque arms or radius rods having the rear end connected to the axle housing and the forward end connected to the vehicle underframe. The function of the torque arms is to keep the axle in horizontal alignment and to prevent the axle from cocking or otherwise moving any great distance due to the stresses and forces applied to the axle when the truck is in operation. Hence, it is the torque arms which keep the axle firmly secured in position during operation of the vehicle. The concept of the present invention envisions replacing the fixed box girder type torque arms and the turn buckle type adjustable torque arms which presently exist on vehicles with the torque rod as shown and described in the present invention. Hence, in addition to providing the function of positioning and securing the axle in position, the novel torque rod of the present invention also functions to sense axle torque and transmits this information to a control valve which will, in turn, regulate the amount of fluid pressure existing in the service brake unit of the vehicle. Hence, under impending skid situations, the torque rod of the present invention is able to sense sudden losses of axle torque, or retarding force, which information ultimately causes the service brake chamber of the brake actuating mechanism to lose fluid pressure thereby to relieve the brakes and to permit the corresponding wheel to rotate more freely and avoid wheel lock-up. Hence, with reference to FIGS. 1 and 3 of the drawings, the novel torque rod 30 of the present invention is shown in position connected at its rear end on the axle housing 14 and its forward end to the underframe 18 of the trailer vehicle 10. The details of constructions of the torque rod 30 of the present invention is more clearly shown in FIG. 4 of the drawings.

Figures 4, 5:
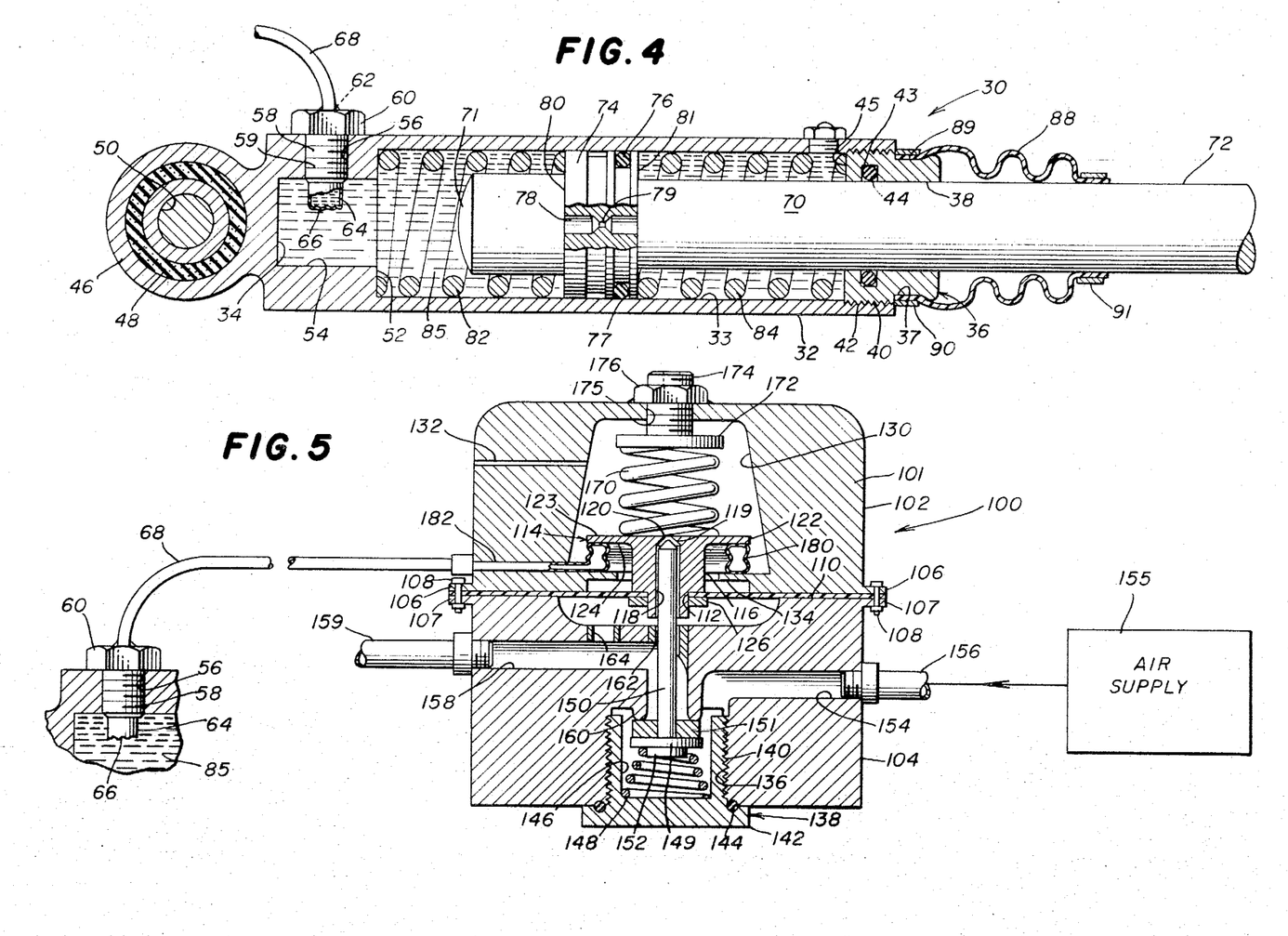
FIG. 4 is a cross sectional view of the novel torque rod of the present invention.
FIG. 5 is a cross sectional view of the control regulator valve which is shown in fluid communication with the torque rod of the present invention as well as with the air supply and the service brake chamber of the brake actuating mechanism.

Referring now to FIG. 4 of the drawings, the torque rod 30 is shown to comprise a housing 32 which is generally cylindrical in shape thereby forming a main chamber 33 bounded by a rear wall 34 at the rear end of the housing 32 and a closure plug 36 at the forward end of the housing 32. The outer end of the closure plug 36 is shown to have a neck 37 formed by restriction in the outer end thereof, and is provided with a central aperture 38 for a purpose to be described hereinafter. The plug 36 is held in engagement with the housing 32 by means of external threads 40 which mate with the internal threads 42 disposed along the inner periphery of the outer end of the housing 32. The plug 36 includes an annular recess 43 adjacent its inner end in which an O-ring 44 is disposed for a purpose to be described hereinafter. The inner end of the plug 36 is formed into a spring biasing wall 45 for biasing spring 84 in a manner to be described hereinafter.

The rear end of the torque rod 30 is provided with a rear mounting eye 46 which is substantially circular in configuration and includes a rubber bushing 48 and an aperture bolt guide 49 which thereby forms a central bolt hole 50. In use, the rear mounting eye 46 is mounted to the axle housing 14 of a corresponding wheel 12 and is held there in position by a bolt inserted through the central bolt hole 50.

A spring retention shoulder 52 is formed within the housing 32 adjacent to and spaced forwardly from the rear wall 34 thereof. The area bounded by the rear wall 34, and the spring retention shoulder 52 forms a subchamber generally referred to by numeral 54. The subchamber 54 includes an aperture 56 disposed therethrough and extending through the wall of the housing 32 through which a pressure sensing tube 58 is disposed. The pressure sensing tube 58 has a threaded head 59 which permits engagement with mating threads appropriately provided in the aperture 56 through the housing 32 thereby to securely hold the pressure sensing tube 58 in position. A portion of the pressure sensing tube 58 extends beyond the outer periphery of the housing 32 and is held in position by a holding nut 60 which is threadedly secured thereon. The nut 60 is provided with a port 62 in which a fluid line 68 is held in fluid-tight engagement. The lower end 64 of tube 58 is bounded by a convoluted end wall 66 which is formed usually from an elastic-type metal material thereby permitting flexing of the convoluted end wall 66 under conditions of pressure exerted against the convoluted end wall 66. As shown in FIG. 5 the fluid line 69 extending from the port 62 in the nut 60 connects the torque rod 30 with the regulator valve 100 in a manner to be described more fully hereinafter.

The torque rod 30 is provided with a piston 70 which is diposed within the housing 32 thereof. The piston 70 has a diameter which is substantially less than the internal diameter of the housing 32 whereby the piston is movably disposed therein. The piston 70 includes an inner end 71 and an outer end 72 and having a piston head 74 securely mounted on the piston 70 adjacent the inner end 71 thereof. The external diameter of the piston head 74 is very slightly less or substantially the same as the internal diameter of the cylindrical housing 32 whereby the piston head is slidably disposed along the inner surface of the housing 32. A fluid-type seal is provided by means of an O-ring 76 suitably positioned within an annular recess 77 disposed in the piston head 74. Fluid communication across and through the piston head 74 is accomplished by means of an hour glass or other suitably shaped or adjustable orifice 78 which is provided with a restricted throat 79. The piston head 74 includes an inner surface 80 and an outer surface 81, the inner surface 80 functioning as a spring biasing wall for inner spring 82 and the outer surface 81 functioning as a spring biasing surface for outer spring 84.

The piston 70 and piston head 74 are held in spring biased relationship by means of inner spring 82 and outer spring 84. Inner spring 82 is biased between the spring retention shoulder 52 formed in the housing 32 and the inner surface 80 of piston head 74. Similarly, outer spring 84 is biased between the outer surface 81 of the piston head 74 and the inner spring retention wall 45 of closure plug 36. The springs 82 and 84 have sufficient mutual compressional force whereby only very limited movement of the piston 70 and corresponding piston head 74 is permitted.

As depicted in FIG. 4 of the drawings, the housing 32 is completely filled with hydraulic fluid 85, whereby hydraulic fluid 85 fills not only the main chamber 33, but also the subchamber 54. The orifice 78 permits the passage of hydraulic fluid 85 therethrough whereby the complete main chamber 33 and the subchamber 54 are provided with the maximum amount of hydraulic fluid 85, permitted by the volume of chambers 33 and 54 respectively.

The outer end 72 of piston 70 is shown to extend through the central aperture 38 in closure plug 36 and a fluid tight seal is maintained by virtue of O-ring 44. Hence, the piston 70 is permitted lateral movement through the closure plug 36 while at the same time ensuring that a fluid-tight seal is maintained. Dirt and other foreign particles are prevented from entering into the main chamber 33 by means of a protective bellows 88 which envelopes a portion of the outer end 72 of the piston 70. The base 89, of protective bellows 88 is fitted about the neck 37 of the closure plug 36 and is securely held in position by means of an inner spring clamp 90 which is similarly fitted about neck 37. In this manner, the base 89 of bellows 88 is prevented from accidentally slipping off of the closure plug 36 due to the fact that as mentioned hereinabove, the neck 37 is formed by a restriction in the outer end of the closure plug 36. The outer end of the bellows 88 is securely fastened to the piston 70 at a point spaced inwardly from the outer end 72 by means of an outer spring clamp 91 which exerts sufficient tensional forces to keep the outer end of the bellows 88 in secure engagement with the piston 70.

At the extreme outer end of the piston 70 is positioned a forward mounting eye 94 as is more particularly shown in FIGS. 2 and 3 of the drawings. The forward mounting eye 94 is constructed in a manner similar to the rear mounting eye 46, and hence, is also provided with a central bolt hole through which a bolt may be inserted for mounting the outer end 72 of the piston 70 to an appropriate surface, such as the underframe 18 of the trailer vehicle 10.

With reference to FIG. 4 of the drawings, the control regulator valve, generally referred by the numeral 100, is illustrated. As mentioned previously, the control valve 100 is in fluid communication with the torque rod 30 and receives information relating to any sudden changes existing in the torque of the axle and utilizes this information for, in turn, controlling the fluid pressure existing in the service brake chamber of the brake actuating mechanism. The control valve 100 is formed by housing 101 which includes an upper section 102 and a lower section 104, the upper section 102 having upper closure flanges 106 and the lower section 104 having lower closure flanges 107, the flanges 106 and 107 respectively having apertures therethrough for receiving bolts 108 therethrough thereby to securely fasten the upper section 102 with the lower section 104 in fluid-tight engagement. A diaphragm 110 is interposed between the upper section 102 and the lower section At t e extreme outer end of the piston 70 is positioned a forward mounting eye 94 as is more particularly shown in FIG. 2 and 3 of the drawings. The forward mounting eye 94 is constructed in a manner similar to the rear mounting eye 46, and hence, is also provided with a central blot hole through which a bolt may be inserted for mounting the outer end 72 of the piston 70 to an appropriate surface, such as the underframe 18 of the trailer vehicle 10.

With reference to FIG. 4 of the drawings, the control regulator valve, generally referred by the numeral 100, is illustrated. As mentioned previously, the control valve 100 is in fluid communication with the torque rod 30 and receives information relating to any sudden changes existing in the torque of the axle and utilizes this information for, in turn, controlling the fluid pressure existing in the service brake chamber of the brake actuating mechanism. The control valve 100 is formed by housing 101 which includes an upper section 102 and a lower section 104, the upper section 102 having upper closure flanges 106 and the lower section 104 having lower closure flanges 107, the flanges 106 and 107 respectively having apertures therethrough for receiving bolts 108 therethrough thereby to securely fasten the upper section 102 with the lower section 104 in fluid-tight engagement. A diaphragm 110 is interposed between the upper section 102 and the lower section 104 and is held securely in place by having the peripheral edges thereof interposed between the upper closure flanges 106 and the lower closure flanges 107 as the unit is assembled.

The diaphragm 110 includes a central aperture 112 which accommodates a T-shaped valve seat 114 securely fastened therethrough. The T-shaped valve seat 114 includes a central portion 116 which is centrally cored along its vertical axis as shown at 118, the upper portion of the core 118 having inwardly bevelled sides 119 and an open port 120 at the top end thereof. The upper portion of the T-shaped valve seat 114 has an annular wing 122 extending outwardly from the central portion 116, the annular wing 122 having an upper surface 123 and a lower surface 124. The T-shaped valve seat 114 is held in position by means of a nut 126 which may be either press fitted or threadedly secured thereto. thereby to securely fasten the T-shaped valve seat to the diaphragm 110.

The upper and lower sections 102 and 104 respectively, form an upper valve chamber 130 in which a portion of the diaphragm 110 and the T-shaped valve seat 114 are accommodated. The upper valve chamber 130 is vented to atmosphere via a vent opening 132, for a purpose to be described hereinafter. Adjacent the lower portion of the upper section 102 of the housing 101 is formed an annular ledge 134 which is formed by an inwardly extending annular structure, the annular ledge 134 being spaced from and in vertical alignment with the annular wing 122 of the T-shaped valve seat 114. A bellows 180 is interposed between the lower surface 124 of the annular wing 122 and the upper surface of the annular ledge 134, the bellows 180 being in fluid communication with the torque rod 30 via a fluid line 182 which ultimately joins with fluid line 68 extending from port 62. Hence, it will be appreciated that the T-shaped valve seat 114 is permitted to move with respect to the annular ledge 134 by means of expansion and retraction of the bellows 180. The method of operation of the device will be described hereinafter.

The lower section 104 of the housing 101 is shown to include a threaded core 136 adjacent the lower end thereof which accommodates a plug 138 having threads 140 provided for mating engagement with the threaded core 136. The plug 138 has an enlarged head 142 and is provided with an O-ring 144 which thereby provides a fluid-tight seal between the plug 138 and the core 136. The interior of the plug 138 is hollow thereby to provide a chamber 146 which accomodates therein a spring 148.

The spring 148 biases against the undersurface of the head 142 of plug 138 at its one end and against the base 149 of a valve pin 150. The valve pin 150 is shown to extend vertically through a port 162 and through the core 118, and has an inwardly bevelled head, the bevel of the valve pin head being the same as the angle of the inwardly bevelled sides 119 whereby the head of the valve pin 150 is permitted to open and close port 120 as the valve pin 150 is caused to move upwardly whereby the bevelled head of the pin 150 mates with the bevelled sides 119 of the core 118. A gasket 151 is disposed on the upper surface on the base 149 of the valve pin 150, the gasket 151 serving to open and close passage 162 as the valve pin 150 moves downwardly and upwardly respectively. Immediately below the base 149 of the valve pin 150 is a spring positioning seat 152 which serves to position and hold the upper end of spring 148 in position and to prevent the same from cocking during the operation of the valve.

The valve 100 is provided with a fluid inlet passageway 154 which is in fluid communication with a fluid reservoir 155 or the air supply of the trailer vehicle, via a conduit 156. A fluid outlet passage 158 is provided which is in fluid communication with the port 162 and with the chamber 146 in the plug 138. The outlet passage 158 is in fluid communication with the service brake chamber of the brake unit 20 via a conduit 159. As shown in FIG. 5, the fluid outlet passage 158 turns downwardly at a right angle adjacent the central portion of the lower section 104 of the housing 101 and forms a lip 160 against which the gasket 151 of the valve 150 seats. In this manner, the fluid inlet passageway 154 is closed when the gasket 151 is seated against the lip 160, whereby air or other fluid coming from the reservoir 155 is not permitted to enter into the outlet passage 158 and therefore into the service brake chamber of the brake actuating mechanism. Fluid communication between the fluid outlet passageway 158 and the upper valve chamber 130 is facilitated by means of an auxiliary fluid port 164 which as will be explained more fully hereinafter, facilities the bleeding or dumping of fluid pressure from the service brake chamber under conditions of impending wheel lock-up.

The upper valve chamber 130 is shown to include a spring 170 which is held between a spring positioning platform 172 and the upper surface 123 of the T-shaped valve seat 114. The spring positioning platform 172 includes a threaded stem 174 which extends upwardly therefrom through an opening 175 in the top of the housing 101. A nut 176 is threadedly mounted on the stem 174 thereby to hold and position the spring positioning platform 172 in the desired position. It is clear that the tension on the spring 170 may be varied by screwing the nut 176 down against the threaded stem 174 thereby raising the spring positioning platform 172 upwardly. Similarly, the tension on the spring 170 may be increased by unscrewing the nut 176 with respect to the stem 174 which thereby forces the spring positioning platform 172 downwardly.

In actual operation, the regulator control valve 100 is connected, as indicated, to the air supply 155 at its one end, and to the service brake chamber of the brake actuating mechanism via a fluid line 159. The pressure in the air supply reservoir 155 is approximately 90 to 100 lbs. PSIG of pressure and the system is dynamic rather than static, therefore, the pressure in the fluid outlet passage 158 is roughly the same as the pressure in the fluid inlet passage 154 and this is accomplished by means of a fluttering action of the valve pin 150. Hence, under normal operating conditions, the pressure in both of the fluid inlet passageway 154 and fluid outlet passageway 158 is roughly equivalent. When the bellows 180 is caused to expand, the bellows 180 pushes upwardly against the undersurface 124 of the T-shaped valve seat 122 causing the same to rise upwardly against the tensional forces exerted by spring 170. This causes the port 120 to be lifted off of the bevelled head of the valve pin 150 and establishes fluid communication between the outlet passage 158, via passage 164, core 118, through port 120, and ultimately through the vent opening 132 to atmosphere. The gasket 151 of the valve pin 150 closes the fluid inlet passage 154 by seating against lip 160. Hence, the only passageway available for air pressure to flow is through passageway 158, passage 164, core 118, port 120 and ultimately through vent opening 132 to atmosphere thereby releasing the fluid pressure in the service brake chamber of the brake actuating mechanism. In this manner, the pressure in the service brake unit is reduced causing the brake in the affected wheel to be under reduced pressure and thereby relieve the brake shoes or brake discs, as the case may be, from frictional engagement with the rotating member therein, thereby permitting the wheel to rotate more freely.

In normal operation, the operator of a vehicle such as a truck tractor with a trailer attached will accelerate and deaccelerate the vehicle depending upon the conditions which exist on the road at that time. In all such normal driving operations, the anti-skid system of the present invention will remain inactive. That is, the torque rod of the present invention which replaces the normal torque arm, which is of the box girder construction presently existing on vehicles, is constructed under such tolerances that such normal acceleration and deacceleration movements of the vehicle will not cause any significant pressure changes which would activate the control valve to affect, in turn, the brake actuating mechanism. It will be appreciated that under normal braking conditions, the truck body tends to go forward while the axle is tended to be pulled rearwardly by virtue of the action of the brakes on the wheels. The torque of the axle tends to decrease somewhat slowly under such normal stopping situations and therefore, no significant changes are sensed by the torque rod. Where, however, a skid situation is presented, such as for example, in a braking situation where one of the vehicles' wheels encounters ice or another slick road condition, the lack of frictional force between the rotating wheel and the underlying surface is easily overcome by the pressure of the brakes, and hence, the wheel tends to go into a wheel lock situation. If that particular wheel subsequently hits a dry portion of the pavement, a skidding or jack knife situation is presented. According to the present invention, it has been determined that when a potential wheel lock situation is presented, the torque of the axle suddenly decreases by a substantial amount which thereby causes the piston within the torque rod to move toward the rearward end of the housing whereby the piston head exerts a pressure upon the hydraulic fluid which is rearward thereof. This fluid pressure is sensed by the pressure sensing tube system (58 in the drawings) by causing the convoluted end wall 66 to be pushed upwardly. This causes a concomitant fluid pressure to be exerted in the pressure line 68 which thereafter causes the bellows 180 to become expanded. Such action will then lift the T-shaped valve seat 114 upwardly whereby a fluid path is opened from the fluid outlet line 158 to atmosphere via auxiliary escape port 164, port 162, core 118, port 120 and vent opening 132. Hence, fluid pressure from he service chamber of the brake actuating mechanism will be bled off through line 159 and 158 to atmosphere causing a reduction in the pressure of the fluid within the brake actuating mechanism thereby to at least partially release the brakes from the activated position permitting the wheel to rotate more freely.

The system is quickly self-restoring since the hydraulic fluid within the torque rod housing 32 tends to flow through the hour glass orifice 78 immediately after the skid situation has occurred. The piston 70 will tend, once again, to move toward the forward end of the torque rod 30 until equilibrium is reached, and during this process, the pressure against the convoluted end wall 66 of the pressure sensing tube 58 is relieved whereby the fluid pressure in line 68 is caused to be reduced whereupon the bellows retracts seating the T-shaped valve seat 114 back against the bevelled head of the valve pin 150 to once again shut off the fluid path between the service chamber of the brake actuating mechanism and the atmosphere. Thereafter, the system tends to achieve equilibrium in that the pressure in the fluid inlet passageway 154 and the pressure in the fluid outlet passageway 158 tends to reach equilibrium dynamically as the valve pin 150 flutters until pressure on the output line has been established at the same level, determined by the setting of the spring as the difference between the spring pressure and the output pressure.

Figure 6:
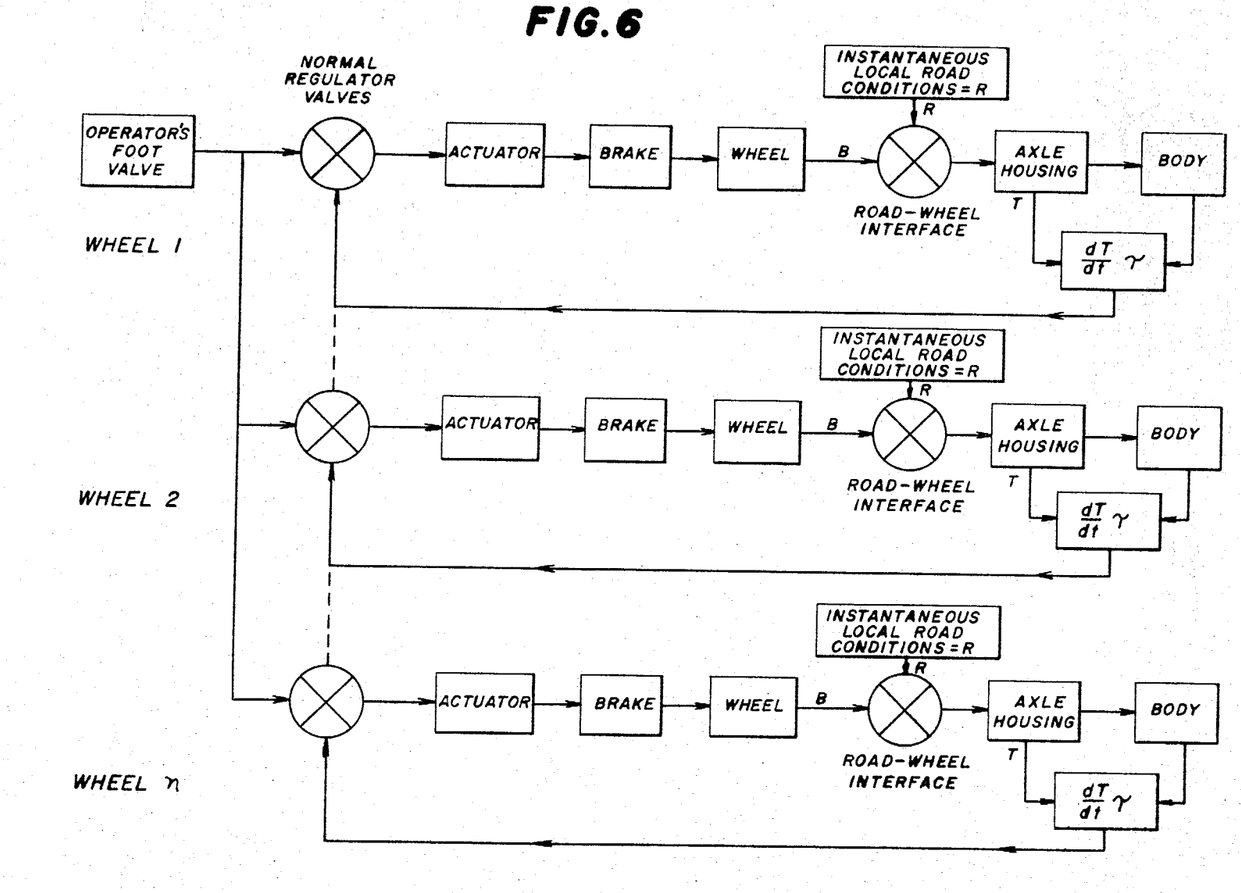
FIG. 6 is a block diagram showing the interrelationship of the various elements involved in the braking of a multi-wheel vehicle.

The interrelationship of the various elements involved in a normal stopping situation and in a skidding situation is shown in the block diagram of FIG. 6. When the operator operates the foot valve, or brake pedal, air is supplied to each element of the system, that is, each of the various wheels. The output of air pressure is regulated by means of the normal regulator valves existing in such systems, and the air is in turn applied to the actuator, the brake, and ultimately, the wheel. The road-wheel interface, upon which the wheel is resting, acts as a virtual summing point in that during braking, wheel deceleration and instantaneous local road conditions at a given wheel are combined to give a resultant local torque to the axle housing. The dynamics of the situation are such that a loss or reduction in the maximum axle torque for a given road condition is indicative of an incipient skid or wheel lock-up, and this condition can be countered by a momentary reduction in braking force to the wheel or wheels encountering the incipient wheel lock-up. The system of the present invention as described hereinabove is designed to compute and utilize the derivative of axle torque with respect to time resulting in a fast acting device which is, on the other hand, self-restoring once the incipient wheel skid situation has occurred.

As indicated in FIG. 6, the rate of change of torque with respect to time or the derivative of torque having a certain time constant is then fed to the regulator valve such that a reduction in the local axle housing torque is translated into a reduction in fluid pressure to the actuator, the duration and magnitude of which is determined by the initial skidding impulse and the time constant value. The derivative of torque is algebraically summed with the input command from the operator to give an actuator input which maximizes axle housing torque, and concomitantly avoiding wheel lock-up.

Since the static value of pressure supplied by the regulator to the actuator approaches the value of the inlet pressure from the operator's foot valve, the opposite polarity signal from the system of the present invention during normal stopping, which would tend to increase the pressure, will have little affect upon the operation of the control loop. Hence, it is clear that the system of the present invention will function only at a point in time where there is a sudden loss of torque in the axle housing which thereby results in a sudden reduction in the fluid pressure of the brake chamber of the brake actuating mechanism.

The torque rod operating elements are formulated from a low to moderate carbon steel of the type which is normally used for shock absorbers and other similar type equipment for automotive use. Hence, the housing of the torque rod as well as the piston and piston head are formulated of such materials and are therefore relatively inexpensive in cost. With respect to the springs which spring-bias the piston head within the torque rod housing, the springs must have relatively great compressive force potential so that the movement of the piston within the housing is relatively small. For example, the maximum amount of movement that is contemplated of the piston head within the torque rod housing would be on the order of ¼ to ½ inch in response to the input of a pressure on the order of 10,000 to 20,000 pounds of pressure. In other words, the torque rod continues to function as a retention means for the axle whereby the axle is restrained so that it does not cock with respect to the lineal alignment thereof. Hence, the only movement of the piston within the torque rod housing which is required is a sufficient degree of movement to exert a fluid pressure on the pressure sensing tube 58 whereupon fluid pressure will be exerted to expand the bellows in the regulator valve 100 to operate in the manner indicated hereinabove.

The hydraulic fluid which is employed in the torque rod may consist of the standard type of brake fluid having a viscosity in the range of 5. to 20. centipoises. There must, of course, be compatibility between the hydraulic fluid which is utilized and the material of which the various seals are composed. For example, where seals are used which are formed of nitral rubber or a material of this nature, silicone brake fluid or silicone hydraulic fluids may be utilized and these materials have a much better viscosity characteristic as a function of temperature. Hence, it will be appreciated that the particular hydraulic fluid which is utilized is a function of the materials of which other components are constructed such as the seals, the bellows, and the like. Suffice it to say that the criticality resides in the determination of the time constant of the function of the derivative of torque which is used to regulate the actuator pressure, and the derivative of torque and its time constant is a function of the viscosity of the fluid and the size of the orifice as well as the materials of which the seals and the bellows are constructed.

With respect to the regulator control valve, it will be appreciated that the construction of such a control valve may be varied in various manners without departing from the spirit and scope of the present invention. The only criticality for such a regulator control valve is that it be capable of responding to pressures sent by the torque rod in response to sudden changes in the axle housing torque which will in turn operate to open a passageway between the service brake chamber of the brake actuating mechanism and atmosphere while at the same time closing off the inlet line from the air supply. In this manner, an impending wheel lock-up situation can be controlled by relieving the brake pressure on the wheel which is involved in the impending wheel lock-up thereby to permit the wheel to rotate more freely and prevent the vehicle from entering into a skid situation.

With respect to the construction of the torque rod it will also be appreciated that as opposed to having a closed pressure sensing tube such as the type shown in FIG. 4 of the drawings, it is possible and within the spirit of the present invention to have an open fluid line in fluid communication with the subchamber 54 in the torque rod housing and the upper valve chamber 130 in the control valve 100. This construction contemplates that as the piston head 74 moves rearwardly toward the subchamber 54, hydraulic fluid 85 within the torque rod housing will be pushed into the fluid line 68 thereby causing the bellows 180 to expand and operate in the manner hereinbefore described. It is believed that FIG. 4 illustrates merely the preferred embodiment of this device and that an open fluid line is contemplated to be useful in the spirit of the present invention.

In accordance with the above description, it is clear that there has been provided by virtue of the present invention, an anti-skid system for use in connection with motorized vehicles, such as especially truck trailers and the like which may be conveniently and easily installed upon existing vehicles and which is economical in cost and in maintenance. Furthermore, the anti-skid system and method of the present invention is highly sensitive and will operate to quickly sense an impending wheel lock-up and/or skid situation and thereafter, cause a regulator valve or other means to, in turn, regulate the flow of fluid pressure from the brake chamber of the brake actuating mechanism whereupon the brakes may be released from total frictional engagement and permit the wheel involved in the impending wheel lock-up to rotate more freely. The anti-skid system of the present invention represents a novel system and method for sensing impending wheel lock-up and skid situations in that, rather than attempting to measure or determine the torque existing on the brake unit in a particular wheel, the present system enables one to determine the condition of a wheel at any given point by measuring and sensing the torque existing in the axle or axle housing of each of the wheels, and under a condition whereby this torque and hence stopping force is suddenly lost, the system of the present invention will transmit this information to ultimately cause a control means to reduce and regulate brake pressure and permit the wheel involved to rotate more freely. In addition, the anti-skid system of the present invention is self-restoring and will attain equilibrium immediately after a skid situation has been encountered and will restore itself very efficiently and quickly.

While there has been described what is at present considered to be the preferred embodiment of the present invention, it is to be understood that various modifications may be made therein and it is intended to cover in the appended claims all such modifications which fall within the true spirit and scope of the invention.

What is claimed is:

1. An anti-skid system for use in connection with wheeled vehicles provided with a pressurized fluid braking system and at least one axle for each pair of wheels, the axle being contained within an axle housing, said system comprising axle torque sensing means positionally mounted exteriorly of the braking system and in operative communication with an axle on the vehicle for sensing sudden changes in the torque of the axle, control means mounted on the vehicle exteriorly of said braking system and in operative communication with said axle torque sensing means, and said control means being in operative communication with the pressurized fluid braking system of the vehicle, whereby a sudden change in the axle torque manifesting an impending wheel lock-up will be sensed by said axle torque sensing means and this information then communicated to said control means, which in turn operates to relive fluid pressure from the braking system of the particular wheel wherein such impending wheel lock-up is occurring thereby relieving the brake pressure and permitting the wheel to rotate more freely avoiding wheel lock-up and resulting vehicle skid.

2. The anti-skid system as set forth in claim 1 above, wherein the vehicle is provided with a separate axle torque sensing means and control means for each wheel of the vehicle.

3. The anti-skid system as set forth in claim 1 above, wherein said axle torque sensing means includes a first end mounted on the axle housing of an associated axle and a second end mounted on the body of the vehicle.

4. The anti-skid system as set forth in claim 1 above, wherein said axle torque sensing means comprises a torque rod including a housing forming a chamber, a piston disposed for sliding movement within said housing, said piston head to provide a fluid path through said piston head, fluid completely filling said housing so as to exert fluid pressure under conditions of stress, and fluid pressure sensing means disposed in said housing and position internally of said piston head and in fluid pressure communication with said fluid in said housing and with said control means, whereby sudden changes in the torque of the axle causes movement of said piston within said housing resulting in a pressure exerted upon the fluid within the housing, which pressure is in turn sensed by said fluid pressure sensing means and communicated to said control means which in turn regulates the fluid pressure in the braking system by relieving such pressure to release the brakes and permit relatively free rotation of the wheels.

5. The anti-skid system as set forth in claim 4 above, wherein said fluid pressure sensing means comprises a tubular chamber having a flexible end wall and a port disposed in the top wall, a fluid line interconnecting said port with said control means, and fluid under pressure contained within said tubular chamber and fluid line, whereby pressure exerted against the end wall of said tubular chamber causes a concomitant pressure upon the fluid within said chamber and said fluid line and causes said control means to operate in response to said fluid pressure to relive the brake pressure and permit free rotation of the vehicle wheels.

6. An anti-skid system for use in connection with wheeled vehicles provided with a pressurized fluid braking system of the type including a fluid supply reservoir and a service brake chamber which actuates the brake applying mechanism by means of fluid under pressure and at least one axle for each pair of wheels the axle being contained within the axle housing, the system comprising a torque rod having one end thereof mounted on the axle housing of an axle of said vehicle and exteriorly of the braking system so as to be sensitive to sudden changes in the torque of said axle, control means mounted exteriorly of said braking system and in operative communication with said torque rod and in operative communication with the service brake chamber of the brake actuating mechanism, said control means being actuated by movement of said torque rod under conditions of sudden reduction of axle torque, whereby movement of said torque rod in response to a sudden reduction of the torque in the axle of the vehicle will activate said control means thereby to establish fluid communication between the service brake chamber of the brake actuating mechanism and said control means thereby to withdraw fluid pressure from the service brake chamber causing the brake mechanism to relieve the brake pressure and permit the wheel to rotate more freely.

7. The anti-skid system as set forth in claim 6 above, wherein said torque rod includes a cylindrical housing, said housing having a mounting eye at its rear end for mounting on the vehicle body and an apertured closing at its forward end, a piston movably disposed within said housing, said piston having a piston head adjacent its rear end in fluid sealing contact with the interior walls of said housing and an arm extending through the aperture in the forward end of said housing for mounting on the axle housing, said piston head including an orifice extending therethrough to establish fluid communication across said piston head, fluid completely filling said housing, and fluid pressure sensing means in fluid communication with the fluid within the housing and with said control means, whereby sudden changes in the torque of the associated axle will cause movement of said piston within said housing exerting a pressure against said fluid within said housing which is sensed by said fluid pressure sensing means and in turn communicated to said control means thereby to activate said control means and relieve the brake pressure to permit the associated wheel to rotate more freely.

8. The anti-skid system as set forth in claim 7 wherein said torque rod includes a pair of springs for spring-biasing said piston head of said piston within said housing.

9. The anti-skid system as set forth in claim 6 above, wherein said control means comprises a housing forming a main chamber, said main chamber including a fluid exit passageway, a flexible diaphragm extending across said main chamber and forming a lower valve chamber, a fluid inlet port and fluid outlet port in fluid communication with said lower valve chamber, a valve member biasingly interposed between said fluid inlet and outlet ports in dynamic relationship, said diaphragm including a valve seat mounted thereon and biasingly positioned for seating engagement against said valve member for opening and closing a fluid path between said main chamber and said lower valve chamber, counter-biasing means disposed in said main chamber in fluid communication with said torque rod and positioned to operatively seat and unseat said valve seat, whereby sudden changes in the axle torque of the vehicle are communicated to said counter-biasing means thereby to unseat said valve seat from said valve member and provide a fluid path from said fluid outlet port to said fluid exit passageway.

10. The anti-skid system as set forth in claim 9 wherein said counter-biasing means comprises a flexible bellows member.

11. The anti-skid system as set forth in claim 9 wherein said fluid inlet port is in fluid communication with fluid supply reservoir on the vehicle and said fluid outlet port is in fluid communication with the service brake chamber of the brake actuating mechanism.

12. An anti-skid system for use in connection with wheeled vehicles provided with a pressurized fluid braking system of the type including a fluid supply reservoir and a service brake chamber which actuates the brake applying mechanism by means of fluid under pressure and at least one axle for each pair of wheels, the axle being contained within, or affixed to the end of an axle housing, the system comprising a torque rod including a housing forming chamber, a piston disposed for sliding movement within said housing, said piston provided with a piston head in fluid sealing contact with the interior walls of said housing, an orifice transversing said piston head to provide a fluid path through said piston head, fluid completely filling said housing so as to exert fluid pressure under conditions of stress, and fluid pressure sensing means in fluid pressure communication with said fluid in said housing, control means comprising a housing forming a main chamber, said main chamber including a fluid exit passageway, a flexible diaphragm extending across said main chamber and forming a lower valve chamber, a fluid inlet port and fluid outlet port in fluid communication with said lower valve chamber, a valve member biasingly interposed between said fluid inlet and fluid outlet ports in dynamic relationship, said diaphragm including a valve seat mounted thereon and biasingly positioned for seating engagement against said valve member for opening and closing a fluid path between said main chamber and said lower valve chamber, counter-biasing means disposed in said main chamber in fluid communication with said fluid pressure sensing means in said torque rod and positioned to operably seat and unseat said valve seat, whereby sudden changes in the torque of the associated axle causes movement of said piston within said housing of said torque rod resulting in a pressure being exerted upon the fluid within the housing, which pressure is in turn sensed by said fluid pressure sensing means and communicated to said counter-biasing means of said control means thereby to unseat said valve seat from said valve member and provide a fluid path from said fluid outlet port to said fluid exit passageway so that fluid from said fluid outlet port may flow through the fluid path from the lower valve chamber to said main chamber and out of said fluid exit passageway resulting in a release of brake pressure and thereby permitting the associated wheel to rotate more freely.

13. A torque rod for use in connection with an antiskid system provided for wheeled vehicles having a pressurized fluid braking system and at least one axle for each pair of wheels, the axle being contained within an axle housing, said torque rod comprising a housing forming a chamber, a piston disposed for sliding movement within said housing, said piston provided with a piston head in fluid sealing contact with the interior walls of said housing, an orifice transversing said piston head to provide a fluid path through said piston head, fluid completely filling said housing so as to exert fluid pressure under conditions of stress, and fluid pressure sensing means positioned interiorly of said piston head and in fluid pressure communication with said fluid in said housing and ultimately with the braking system of the vehicle, whereby sudden changes in the torque of the axle will cause movement of said piston within said housing and thereby exert a pressure on said fluid within said housing, which fluid pressure is sensed by said fluid pressure sensing means and ultimately transmitted to said braking system of the vehicle thereby to reduce the brake presure of the brake actuating mechanism and permit the associated wheel to rotate more freely.

14. The torque rod assembly as set forth in claim 13 above, wherein said torque rod includes a pair of springs for spring biasing said piston head of said piston within said housing.

15. The torque rod assembly as set forth in claim 13 above, wherein the rear end of said torque rod is mounted on the axle housing of an associated axle of the vehicle, and the forward end of said torque rod is mounted on the body of the vehicle whereby movement of the axle as measured against the vehicle body is sensed by said torque rod for ultimately controlling the brake pressure existing in the brake actuating mechanism of the associated wheel thereby to control and prevent wheel lock-up and resulting skid situations.

16. The torque rod assembly as set forth in claim 13 above, wherein said fluid pressure sensing means comprises a tubular chamber having a flexible end wall and a port disposed in the top wall, a fluid line interconnecting said port with the braking control system of the vehicle, and fluid under pressure contained within said tubular chamber and said fluid line, whereby pressure exerted against said end wall of said tubular chamber causes a concomitant pressure upon the fluid within said tubular chamber and said fluid line and causes fluid pressure to be exerted in said fluid line and against the braking control system thereby to ultimately relieve the fluid brake pressure in the associated vehicle wheel and permit free rotation of the vehicle wheel.

17. A method for sensing and preventing wheel lock-up and resulting vehicle skidding in connection with a wheeled vehicle of the type having a pressurized fluid braking system for controlling the brake actuating mechanism and at least one axle for each pair of wheels, the steps comprising, providing axle torque sensing means exteriorly of said braking system and adjacent an associated vehicle axle for sensing sudden changes in the torque of the associated vehicle axle, providing control means, positioned exteriorly of and interposed between and in operative communication with the axle torque sensing means and the braking system of the vehicle for controlling the supply of fluid pressure in the brake actuating mechanism in response to actuation of the axle torque sensing means, sensing sudden changes in the torque of an associated vehicle axle by actuation of the axle torque sensing means, transmitting information regarding the sudden changes in the axle torque to the control means, and activating the control means in response to the actuation of the axle torque sensing means thereby to reduce the fluid pressure in the brake actuating mechanism and permit the wheel associated therewith to rotate more freely preventing wheel lock-up and resulting vehicle skid.

* * * * *